United States Patent [19]

Bornstein

[11] 4,352,702
[45] Oct. 5, 1982

[54] METHOD OF MAKING A THERMOPLASTIC RECEPTACLE HAVING IMPROVED HIGH TEMPERATURE SEAL

[75] Inventor: Norman D. Bornstein, Spartanburg, S.C.

[73] Assignee: W. R. Grace & Co., Duncan, S.C.

[21] Appl. No.: 189,459

[22] Filed: Sep. 22, 1980

[51] Int. Cl.$^3$ .................... B29C 27/02; B29D 23/04; B32B 31/28
[52] U.S. Cl. .......................... 156/84; 156/85; 156/244.13; 156/244.14; 156/244.17; 156/244.24; 53/403; 53/405; 53/442; 53/452; 53/479; 428/35; 428/36; 428/516
[58] Field of Search ............ 156/244.11, 244.12, 156/244.13, 244.14, 244.17, 244.24, 272; 428/35, 36, 516; 53/451, 452, 469, 479, 550, 551, 552, 553, 554, 561, 403, 442, 405

[56] References Cited

U.S. PATENT DOCUMENTS

| | | | |
|---|---|---|---|
| 2,936,261 | 5/1960 | Cole | 156/283 |
| 2,997,419 | 8/1961 | Lawton | 156/272 |
| 3,648,834 | 3/1972 | Gifford et al. | 156/244.17 |
| 4,044,187 | 8/1977 | Kremkau | 156/272 |
| 4,064,296 | 12/1977 | Bornstein et al. | 156/244.17 |
| 4,104,404 | 8/1978 | Bieler et al. | 428/516 |
| 4,127,688 | 11/1978 | Bieler et al. | 156/272 |

Primary Examiner—Caleb Weston
Attorney, Agent, or Firm—John J. Toney; William D. Lee, Jr.; Joe Harps

[57] ABSTRACT

The high temperature strength of a heat seal which bonds irradiatively cross-linkable thermoplastic materials together to form a receptacle can be significantly improved by irradiating the receptacle after the seal has been formed. This technique is especially effective for improving the high temperature seal strength of packaging film laminates such as those having a layer of an olefin homopolymer or copolymer and a layer of hydrolyzed ethylene-vinyl acetate copolymer.

6 Claims, No Drawings

METHOD OF MAKING A THERMOPLASTIC RECEPTACLE HAVING IMPROVED HIGH TEMPERATURE SEAL

FIELD OF THE INVENTION

This invention relates to improving the high temperature strength of seals of irradiatively cross-linkable thermoplastic materials, particularly, multi-layer thermoplastic sheet materials in which one of the layers is a hydrolyzed ethylene-vinyl acetate copolymer material.

BACKGROUND OF THE INVENTION

In the flexible packaging industry the use of thermoplastic sheet materials to package or enclose various products often requires the sealing together of the sheet materials by adhesives or heat to make a complete receptacle. However, seal integrity becomes difficult to achieve and maintain when the package is subjected to abusive handling and to media of differing temperatures, particularly high temperatures that approach or exceed the boiling temperature of water. This is especially true in certain thermoplastic materials which seal readily but form seals weaker than are desired. Such seals often occur when polyethylene or ethylene-vinyl acetate copolymer materials (hereinafter called "EVA") are joined.

Single layer, self-supporting films may be made from polyethylene or from EVA or a layer or layers of a laminate may be made from polyethylene or EVA; and, sometimes, it is desirable that the polyethylene or EVA layer of a laminate be crosslinked chemically or irradiatively to improve the strength properties thereof. However, no matter how strong a packaging film is, obviously, a package made from film is no stronger than the seals made in the film. Thus, it is one object of the subject invention to provide a method of strengthening the seals of crosslinkable packaging materials, particularly, strengthening the high temperature seals.

To produce a seal, certain prior art patents have suggested that prior to any sealing that the area to be sealed be irradiated so that the effects of radiation alone produce the seal. For example, in U.S. Pat. No. 2,997,419 which issued on Aug. 22, 1961 to E. J. Lawton, two sheets of polyester material are welded together by irradiating the contacting sheets with high energy electrons but the energy from the electrons alone is responsible for the welding of the polyester. Accordingly, it is another object of the present invention to enhance the strength of a seal previously formed by heat between thermoplastic materials. In another prior art patent, U.S. Pat. No. 2,936,261 which issued on May 10, 1960 to Q. P. Cole, a method of sealing together irradiated polyethylene sheets is described wherein the sealing is achieved by interposing a polymeric material between the layers which has a curing or cross-linking agent therein. However, it is an object of the present invention to improve the strength of heat seals between thermoplastic materials without the use of intermediate compounds or materials. One such improvement is shown in U.S. Pat. No. 4,127,688 which issued to Anne C. Bieler et al. on Nov. 28, 1978.

A necessary feature for packaging many food items is that the packaging material be relatively impervious to gases such as nitrogen, oxygen, and carbon dioxide. A proven flexible plastic material for this purpose is the copolymer of vinylidene chlorie commonly called "saran." However, a mono-layer saran film does not possess the abuse resistance required for present food distribution systems and to overcome this deficiency multi-layer films are used with saran as an interior layer. While such multi-layer films have found successful uses in low and moderate temperature ranges their use in high temperature applications has been limited as the exterior, heat sealing layers are usually polyolefins such as polyethylene and ethylene-vinul acetate with the deficiences mentioned above. Saran/polyolefin laminates have been successfully cross-linked by irradiation as taught by U.S. Pat. No. 4,044,187 which issued Aug. 23, 1977 to William P. Kremkau but one disappointing result of irradiating saran is that it tends to degrade and turn an unsightly brown color. Thus, an object of this invention is to provide an alternative to an irradiated saran/polyolefin laminate.

These and other objects are achieved by the present invention which is described below.

SUMMARY OF THE INVENTION

It has been surprisingly discovered that a thermoplastic receptacle having low gas permeability and strong high temperature seals can be formed from a multi-layer film having olefin, homopolymer, copolymer, or terpolymer outer layers and an interior layer of hydrolyzed ethylene-vinyl acetate copolymer (hereinafter "HEVA") by irradiating the receptacle with ionizing radiation after the receptacle has been formed. Such a multi-layer film is disclosed in U.S. Pat. No. 4,064,296 which issued on Dec. 20, 1977 to Norman D. Bornstein et al.

The receptacles are preferably formed from said multi-layer seamless tubing which has been prepared by coextrusion, flattened, and heat sealed with a transverse seal thus forming an end seal bag or from centerfolded multi-layer film having transverse seals to form side seal bags. The tubing also may be slit longitudinally and then sealed transversly to form side seal bags. Packs can also be formed where two multi-layer film sheets are superposed and three sides are sealed.

In general, in making bags from either flattened tubing or from centerfolded film, the film will be severed adjacent and parallel to a seal. Thus, in end seal bags, the tubing is severed behind one seal to form the mouth of the following bag. In making side seal bags from centerfolded film, the free edges of the film which run longitudinally of the sheet form the bag mouth and the side seals are either two close together parallel seals so the film is severed between seals, or one larger transverse seal wherein severing takes place along the center of the seal.

Multi-layer films can, of course, be formed simply by adhering separately formed plies together or by extrusion coating a molten layer onto a performed layer. Said multi-layer film is preferably oriented, heat shrinkable. Cross-linked EVA and polyethylene are particularly desirable heat shrinkable materials, the degree of cross-linking being equivalent to that induced by a radiation dosage of at least 0.5 MR. After the receptacle has been formed by sealing as described above, the entire receptacle is irradiated or again irradiated, as the case may be, with an additional dosage of 0.5 to 12 MR, preferably 2.0 to 8.0 MR, which will usually be sufficient to increase the high temperature strength of the seals. However, higher or lower dosages may be found satisfactory depending on the particular polyolefin and the requirements forthe film. The resulting receptacle has the ability to withstand seal delamination as the receptacle shrinks and remains in environments of up to 215° F. (102° C.) thus enabling the product within the receptacle to be pastuerized more rapidly.

In another aspect, the subject invention is an improvement in the method of sealing thermoplastic materials together to form a receptacle which comprises sealing or welding the materials together with heat or thermal energy and then irradiating the receptacle with ionizing radiation thereby increasing the strength of the seal and of the receptacle.

In still another aspect, the subject invention is a shaped article such as a tube, sheet, etc. having a heat sealed portion comprising: polyethylene or EVA copolymer materials as a layer or layers in a multi-layer film including a HEVA layer; a seal area where at least two of said materials are sealed together or a single piece of one of said materials is sealed to itself; and, the entire receptacle is irradiated after the receptacle is formed.

In yet another aspect the present invention is the product produced by the above mentioned processes.

DETAILED DESCRIPTION OF THE INVENTION

A useful thermoplastic film laminate in the packaging field is one which has a layer of polyethylene or EVA and a layer of HEVA laminated thereto. Typically, the vinyl acetate content of the ethylene-vinyl acetate copolymer layer may range from as low as 2 or 3% to as high as 25 to 30% or more depending upon the desired packaging application. In order to strengthen polyethylene or ethylene-vinyl acetate copolymer layers and to render them heat shrinkable after stretch orientation it has been necessary to cross-link the polyethylene or ethylene-vinyl acetate copolymer material preferably by irradiating the materials with high energy electrons. Generally, this invention applies to all polyolefin materials which are cross-linkable by irradiation; and, as used herein the term "polyolefin" includes olefin homopolymers, copolymers, terpolymers, etc., and block or graft polymers.

In a preferred embodiment, end seal bags were made from a tubular laminate by flattening the tube and heat sealing the flattened tube transversely and then severing the tube behind the seal. One such tubular laminate had a layer structure as follows: EVA copolymer/HEVA/EVA copolymer, which laminate was formed by coextruding EVA/HEVA/EVA as a multi-layer tube and then irradiating the tube. The layer thicknesses were respectively 15.5 mils, 2.0 mils, and 5.5 mils and the diameter of the tubing was approximately 0.96 inches. Irradiation was performed by passing the flattened tubing or "tape" through the beam from an electron accelerator so that a dosage of approximately 5 MR was received. After the tape was irradiated it was passed through a hot water bath at 212° F. (100° C.), and was inflated to stretch orient it by the well known "trapped bubble" technique to a diameter of about 5.5 inches and wall thickness of about 2.0 mils. After rapidly cooling the stretched tubing to quench it, the now oriented, heat shrinkable tubing was flattened. The irradiated EVA layer forming the inside wall of the oriented tube was sealed to itself by a transverse seal across the width of the flattened tubing. The heat sealing was performed by clamping the flattened tubing between two electrical impulse, resistance heated sealing jaws. The finished bags had a layflat width of 5.5 inches and a length of 9 inches.

A group of the above mentioned bags were placed on trays and passed through an electron beam again to receive an additional dosage of approximately 5.0 MR. Since the bags are irradiated after the finished bag is formed, they are referred to as "post-irradiated" bags.

Small sausages were loaded into both post-irradiated bags and into bags which had not been post-irradiated. Each bag was then evacuated, the bag neck gathered, then clipped by a metal U-clip to hermetically close the bag, and then each bag was immersed in a hot water dip tank held at 198° F. As the bags shrank, the sausages within the bags exerted pressure on the seals and the seals of the bags which had not been reirradiated separated within two minutes. The bags which had been reirradiated survided for 30 minutes at which time testing was discontinued.

In other high temperature tests products packaged in the preferred post-irradiated bags have been held in an autoclave at 215° F. (102° C.) for a period sufficient to pastuerize the product, and in one long term test products were held in water at 170° F. (75° C.) for a period of three hours without seal delamination.

The foregoing test dramatically demonstrates the increased hot seal strength of the post-irradiated bags or receptacles. Without limiting the invention to any particular theory in explaining the increase in seal strength, it is reasonable to assume that not only is the seal itself strengthened by the additional cross-linking, the entire multi-layer film immediately around the seal is also strengthened. In receptacles formed from material not previously irradiated the occurrence of ply-to-ply delamination is significantly reduced. Thus, irradiation of the entire receptacle provides beneficial and unexpected results.

It should be noted that the preferred process of the present invention must be performed with two separate irradiation steps for the following reason. The coextruded EVA/HEVA/EVA tubular laminate must be irradiated or cross-linked in order to be stretch oriented by the bubble technique. Unless it has been so irradiated the laminate is simply not strong enough to be blown into a bubble for continued production without bursting. The minimum dosage needed to impart sufficient strength is about 0.5 to 2.0 MR. The practical maximum dosage is about 12.0 to 20 MR as above that level the film becomes relatively stiff and hard to blow into a bubble. The added dosage in re-irradiation can be as low as 2 MR and preferably not greater than 8 MR depending on the initial irradiation of the film. The preferred dosage is about 5.0 MR for initial irradiation and about 5.0 MR for the post-irradiation.

Other processes exist in the art whereby heat shrinkable receptacles such as a bag or pouch can be made from polyolefin materials by employing heat seals. Heat shrinkable receptacles made by these processes also benefit from post-irradiation of the entire receptacle in that heat seal strength will be increased and the occurrence of ply-to-ply separation at elevated temperatures will be diminished.

This invention is applicable generally to film forming polyolefin homopolymer and copolymer materials which are cross-linkable by irradiation. The specific EVA copolymer in the test for the preferred embodiment above had a vinyl acetate content of about 3½% but EVA's with higher or lower vinyl acetate contents can be satisfactorily employed. Likewise, polyethylene may also be satisfactorily used as the surface of the multi-layer film. In addition, the multi-layer film may comprise as few as two layers, e.g., an EVA/HEVA laminate, or it may employ any number of layers, the basic requirement being that a HEVA layer is included as a gas barrier and that a olefin homopolymer or copolymer layer be included as a surface layer for sealing to itself or another similar polyolefin surface.

As stated in the above mentioned Bornstein et al patent, it is preferred that the HEVA be hydrolyzed to at least 50% with the most preferred degree of hydrolysis being greater than 99%. Also, the mole percent of vinyl acetate prior to hydrolysis should be at least 35%, it having been found that if the mole percent is less than 35% the hydrolyzed copolymer is not an effective gas barrier.

Having thus described my invention; I claim:

1. A process for forming a heat shrinkable, flexible, thermoplastic receptacle having a gas barrier layer wherein food products or the like can be raised to pasteurizing temperatures comprising the steps of:
   (a) coextruding a tubular multi-layer film comprising a layer of hydrolyzed ethylene-vinyl acetate copolymer and an interior surface layer of a polyolefin which is cross-linkable by ionizing radiation, the layers of said multi-layer film being directly melt joined without an adhesive disposed therebetween;
   (b) irradiating said tubing with ionizing radiation to a first dosage level sufficient to allow continuous processing of said tubing by the trapped bubble technique, said dosage level being at least 0.5 MR;
   (c) heating said tubing to the orientation temperature of said polyolefin;
   (d) inflating and then cooling said tubing by the trapped bubble technique to stretch the tubing to film thickness and to orient it thereby producing a heat-shrinkable film;
   (e) sealing selected portions of said film to itself using heat and pressure and severing selected portions of said film to form a heat shrinkable receptacle having an opening; and,
   (f) irradiating the entire receptacle to impart a second and higher dosage level, said second dosage being at least 0.5 MR thereby producing a heat shrinkable receptacle in which a food product can be pasteurized.

2. The process of claim 1 wherein the polyolefin is an ethylene vinyl-acetate copolymer.

3. The process of claim 2 wherein the radiation dosage in both steps (b) and (f) is approximately 5.0 MR.

4. The process of claim 1 including after step (f) the following steps:
   (i) Placing a product in said receptacle;
   (ii) evacuating and hermetically closing said receptacle to form a package; and,
   (iii) heating said package for a period of time sufficient to pasteurize said product and shrink the receptacle.

5. The process of claim 4 wherein in step (iii) the package is heated to at least 198° F. for approximately 30 minutes.

6. The process of claim 5 wherein in step (iii) the package is heated to a temperature of 215° F. to pasteurize the product.

* * * * *